United States Patent [19]

McMahon

[11] 3,771,124

[45] Nov. 6, 1973

[54] COHERENT OPTICAL PROCESSOR FINGERPRINT IDENTIFICATION APPARATUS

[75] Inventor: Donald H. McMahon, Carlisle, Mass.

[73] Assignee: Sperry Rand Corporation, Great Neck, N.Y.

[22] Filed: Jan. 21, 1972

[21] Appl. No.: 219,716

[52] U.S. Cl. .................... 340/146.3 E, 340/146.3 P
[51] Int. Cl. ............................................ G06k 9/13
[58] Field of Search .............. 340/146.3 E, 146.3 P; 356/71; 350/3.5

[56] References Cited

UNITED STATES PATENTS

| | | | |
|---|---|---|---|
| 3,305,834 | 2/1967 | Cooper et al. | 340/146.3 P |
| 3,565,565 | 2/1971 | Reid | 340/146.3 E |
| 3,550,084 | 12/1970 | Bigelow et al. | 340/146.3 P |

*Primary Examiner*—Maynard R. Wilbur
*Assistant Examiner*—Leo H. Boudreau
*Attorney*—Howard P. Terry

[57] ABSTRACT

A fingerprint identification apparatus utilizing coherent optical processing techniques wherein the ridge line orientation in a plurality of preselected finite areas of the fingerprint is inspected by means of a rotating spatial slit filter disposed in the Fourier transform plane of an optical processor for sequentially selecting distinct components of the Fourier transform for transmission to the image plane of the processor whereat a plurality of photodetectors are disposed each corresponding to a discrete sample area. The time delay between a reference orientation of the slit filter and the occurrence of peak light at each detector is noted and a proportional analog or digital representation thereof is generated for storage and subsequent comparison with similarly obtained signals representative of a fingerprint presented for identification.

4 Claims, 7 Drawing Figures

COHERENT OPTICAL PROCESSOR FINGERPRINT IDENTIFICATION APPARATUS

BACKGROUND OF THE INVENTION

1. Field of the Invention

The invention described herein relates generally to coherent optical processors and more particularly to an apparatus for fingerprint identification utilizing coherent optical processing techniques.

2. Description of the Prior Art

In the past several years considerable interest has developed in the use of optical signal processing techniques for fingerprint identification to replace or supplement the classical visual comparison method. The classical method is capable of high reliability commensurate with the skill of a human comparator but is generally limited in one respect or another with regard to various applications. For instance, in the field of criminology, where municipal and state governments or Federal Bureau of Investigation fingerprint files may number in the tens or hundreds of thousands and even into the millions, visual comparison is likely to be extremely time-consuming and inefficient. In the case of credit card identification, on the other hand, the necessity for an extensive search may be avoided by the expedient of recording the owner's fingerprint data in some form directly on the card for subsequent comparison with the fingerprint of the person presenting the card; but, even under these circumstances, a visual comparison is unsuitable because of the general desirability of making the identification automatically without the aid of a skilled operator for efficient consumation of the business transaction. Likewise, in the case of plant security, where it is desired to inhibit unauthorized entry of personnel, the comparison of fingerprint data recorded on an identification card or in a storage file with the actual fingerprint of the person seeking entry must again be made quickly and without the need of a skilled operator.

It is presently well recognized in the art that automated, high speed identification can be obtained by the use of optical signal processing techniques and accordingly a variety of devices and methods have been disclosed heretofore with the objective of satisfying these requirements. In some of these devices, an image of the fingerprint to be identified is compared optically with a prerecorded image of the fingerprint. In other coherent type optical processors, comparison is made between input and prerecorded Fourier transforms representative of the fingerprint data. These image and Fourier transform comparators have been implemented with both conventional and holographic techniques and are essentially matched filter or auto-correlator devices which provide an indication simply of either comparison or non-comparison between a spatially modulated optical beam representative of the fingerprint and the prerecording of the print. In still other somewhat more sophisticated devices, provision is made for inspecting or comparing certain details of the input fingerprint with prerecorded fingerprint data; for instance, the location of ridge line endings or the slope of the ridge lines in one region relative to the slope of the ridge lines in another region. These systems, however, tend to become quite elaborate, requiring implementation of complex design parameters.

Regarding the matched filter or correlator systems, it will be readily apparent that where it is desired to discriminate between large numbers of individuals, a suitable recognition system would preferably provide a plurality of data bits as opposed to a single data bit or analog signal. Irrespective of this consideration, a single data bit device, simply indicating recognition or lack of recognition, has other inherent limitations. For example, where only one data bit is available, digitalizing of the data is not possible. Such capability may be highly desirable or even essential, however, in certain applications for rapid data transmission, digital computer processing, and compatibility with conventional drum, disk or tape storage. Further, reliance on a single composite signal, as provided by a matched filter device, greatly affects accuracy and discrimination capability since such devices, by commingling the effects produced at spatially separate parts of the fingerprint, become considerably more sensitive to distortion of the print.

Accordingly, it is an object of the present invention to provide an improved fingerprint inspection apparatus which is comparatively simple to manufacture, less sensitive to finger orientation and distortion, less sensitive to optical and manufacturing tolerances, capable of high reliability, and adaptable to digital computer processing.

SUMMARY OF THE INVENTION

Before processing with a general description of the method and apparatus embodying the principles of the invention, it is worthwhile first to consider briefly the nature of a fingerprint. In general, a fingerprint is characterized by a pattern of ridge lines having relatively constant spacing and orientation over any finite small area. The invention is based on inspection of the ridge line orientation in a plurality of small sample areas distributed over the area of the fingerprint. It will be appreciated that in a given fingerprint the various ridge line orientations at the plurality of sample positions will be uniquely different from the ridge line orientations at a plurality of similar positions for any other fingerprint provided a sufficient number of sample areas is used. An appreciation of the discrimination capability will be obtained from the following quantitative example. Assume that the average angular difference in ridge line orientations at a plurality of corresponding points (sample areas) of different fingers is about 25° and that the average angular registration repeatability of any one fingerprint can be about 2.5°. Under these conditions there would be ten distinguishable angle values for each sample area. Thus, in the case of 20 sample areas, the number of distinguishable fingerprints would be approximately $10^{20}$. Actually, though, the discrimination capability is not this great because finger distortion, which invariably occurs, requires that the identification apparatus have design tolerances greater than 2.5°. Consider, for instance, that the angle tolerance is increased to 12°, that is ±6° of the correct ridge line orientation. The proper person then would have little difficulty being recognized; but for any other person, the probability of being improperly identified would be $(12/25)^{20} \approx 10^{-6}$, or about one chance in a million.

The invention employs a coherent optical processing technique wherein inspection of the plurality of finite sample areas of the fingerprint is performed in the Fourier transform plane by means of a scanning spatial filter as will be described monentarily. To understand how this is done, it must first be understood that the generally constant ridge line spacing in the finite sample areas causes essentially all such small areas of the fingerprint to exhibit a simple Fourier transform pattern characterized by a pair of diffraction lobes symmetrically disposed about a central undiffracted spot on a line perpendicular to the related ridge lines, with the result that the composite Fourier transform pattern of all the sample areas lies substantially in a circular band concentrically disposed about the undiffracted component of the fingerprint representative beam. Moreover, those skilled in the art will recognize that ridge lines having a particular orientation will produce essentially the same Fourier transform pattern irrespective of their location in the area of the fingerprint. It is thus essential to the operation of the invention to determine precisely, within the whole area of the fingerprint, the exact location of the rigid lines producing each discrete component of the composite Fourier transform pattern. In apparatus constructed according to the principles of the present invention, this determination is made in the image plane of the optical processor.

From a conceptual standpoint, apparatus embodying the principles of the invention pursuant to attainment of the aforestated objects includes means for directing a coherent optical beam onto a fingerprint to produce a spatially modulated beam representative of the fingerprint ridge line orientations. The spatially modulated beam is then focused to produce an optical Fourier transform of the fingerprint. The light constituting the Fourier transform, in turn, is collected to produce an image of the fingerprint in the image plane of the processor whereat a plurality of photodetectors are positioned at locations corresponding to the areas of the print which are to be sampled. A rotatable sector slit mask positioned in the Fourier transform plane is rotated about the optical axis of the processor oriented perpendicular to the Fourier plane whereby the mask sequentially selects distinct angular components of the composite Fourier transform, representative of respective sample areas, for transmission to the photodetectors in the image plane. It will be understood that in the Fourier transform plane the light from any given area of the fingerprint is separable from the light from any other part since the respective Fourier components each pass through the Fourier plane with a unique propagational direction. It is this difference of propagational direction which enables the light from various areas of the fingerprint to be collected by corresponding discrete detectors in the image plane. Thus, as the mask rotates, the light intensity reaching each photodetector changes abruptly to a peak or extreme value at the instant the sector slit intercepts the segment of the Fourier transform corresponding to the particular sample area which relates to that detector. Hence a given fingerprint pattern can be uniquely encoded by noting the instant, relative to an arbitrary time reference, at which the signal level changes at the various detectors. This will be understood more fully after reading the following description of the method of using the invention for fingerprint encoding and inspection.

Assume initially that it is desired to obtain a digital coder representative of a known fingerprint. This is accomplished by inserting the known fingerprint in the processor in the path of an illuminating coherent optical beam to produce a spatially modulated beam which is then focused onto the Fourier transform plane forming a generally circular shaped band of diffracted light substantially concentric with the rotational axis of the sector slit mask. The stated conditions of circularity and concentricity regarding the Fourier transform are not essential but are assumed here for simplicity of description and ease of understanding. As the slit of the mask rotates, a sequence of synchronized timing pulses, representative of the slit orientation relative to a reference orientation, is generated and applied to a digital counter which in turn is coupled to a plurality of multi-stage storage registers for parallel digital signal processing. When the signal amplitude of each photodetector abruptly changes as previously explained, a clock pulse is applied to the stages of an associated storage register causing the instantaneous counter reading to be transferred to the register. As a result of this action, each storage register will contain a unique set of binary signals representative of the ridge line orientation of a discrete sample area of the known fingerprint. These encoded signals can then be stored in any convenient manner suitable for rapid access and subsequent correlation with signals obtained in the course of inspecting fingerprints at some later time. Only when a nearly identical print is presented for inspection, however, will corresponding codes be produced which will auto-correlate with the stored signals for all of the sampling areas. The same procedure is followed for each fingerprint desired to be stored.

It will be recognized that although correlation may occur between some of the sample areas for different fingerprints, the unique ridge line orientation characteristics of each individual fingerprint will preclude correlation at all of the sample areas except for the case of nearly identical fingerprints. As previously mentioned, ridge lines of a particular orientation will produce essentially the same Fourier transform pattern irrespective of the location of the ridge lines in the total fingerprint area. It is essential for an understanding of the invention, therefore, to recognize that a distinct component of the composite Fourier transform corresponding to a particular sample area of the fingerprint also has a unique relationship to a distinct detector in the image plane. Thus, by noting the peak value of light intensity at the discrete areas of the image plane and further noting the angular orientation of the sector slit mask at each occurrence of peak light intensity, it is possible to determine the location in the fingerprint of the ridge lines of particular orientations.

It should now be apparent that since discrimination between fingerprints is based essentially on angular scanning of the Fourier transform, the apparatus will indeed be less sensitive to finger distortion as well as optical and manufacturing tolerances. In addition, the foregoing remarks have indicated the inherent adaptability of the system to digital encoding and use in conjunction with digital computer equipment. For a more thorough description of the invention, reference should now be made to the following detailed descriptions given with reference to the appended drawings.

DESCRIPTION OF THE PREFERRED EMBODIMENTS

Figure 1:
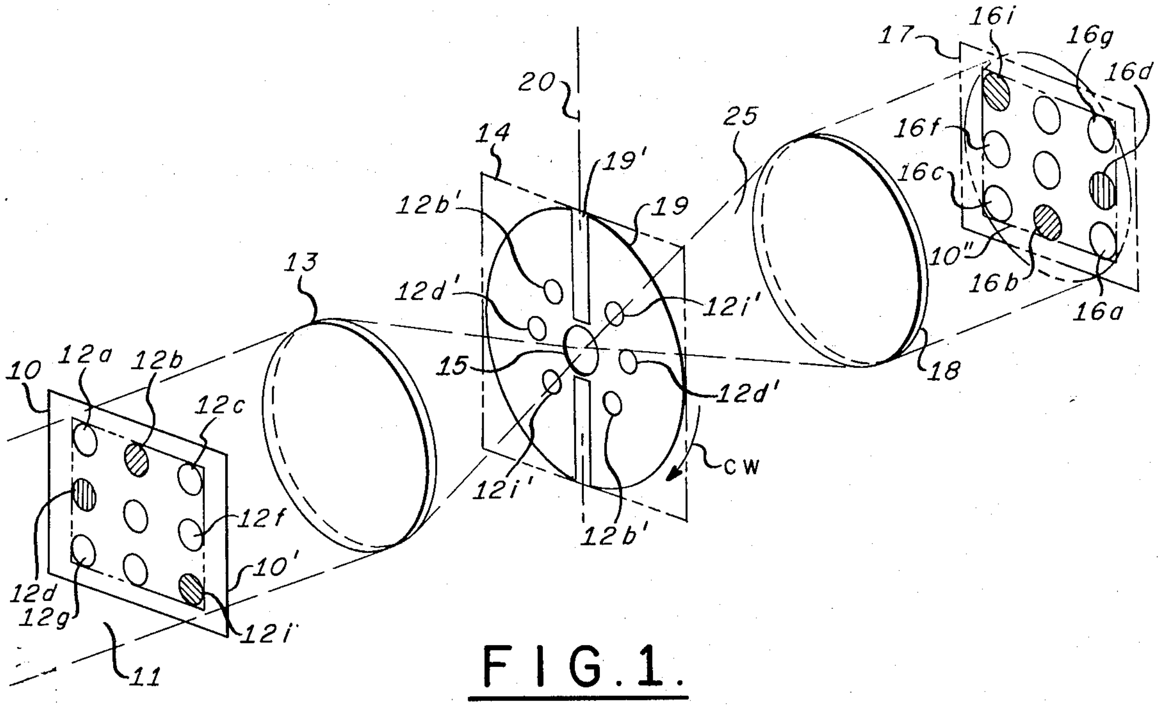
FIG. 1 is an optical perspective schematic of a simplified apparatus embodying the principles of the invention.

Referring to FIG. 1, a fingerprint transparency 10 is disposed in the path of a coherent optical beam 11 which can be obtained from a laser or other suitable point light source. The fingerprint, which is not shown in detail for simplicity of presentation, is intended to be represented as confined within the area enclosed by the dashed line 10'. The small regions designated **12*a* to 12*i* represent sample areas in which the ridge line detail of the fingerprint is to be inspected. For purposes of description, it is assumed that the ridge line orientation is vertical in area 12*d* and slanted to the right and left, respectively, in areas 12*b* and 12*i*. Lens 13 collects the light transmitted through the transparency and focuses it in the Fourier transform plane 14. The central dot 15 represents the light intensity in the Fourier plane produced by the undiffracted light transmitted through the transparency. Dots 12*b*', 12*d*' and 12*i*' represent the Fourier components, that is the diffracted or spatial frequency components, corresponding to the ridge line orientations in sample areas 12*b*, 12*d* and 12*i*, respectively, of the transparency. It is seen that each discrete ridge line orientation produces two major diffraction lobes symmetrically disposed about the undiffracted center dot 15** on a line normal to the ridge lines so that the left half of the Fourier plane is essentially a duplicate of the right half. All of the sample areas in the transparency plane produce simple Fourier transforms in the same manner. The exact shape of the lobes, circular or otherwise, depends of course on the curvature of the ridge lines in the individual sample areas as is well known to those skilled in the art.

It should be understood at this point that the sample areas are not physically formed by any structure located in or adjacent to the transparency plane but rather are defined by the location of the detectors **16*a* to 16*i* in the image plane 17 where detectors 16*a* to 16*i* correspond respectively to sample areas 12*a* to 12*i* in accordance with the inverting qualities of lenses 13 and 18. The nature of the sampling will be understood more fully as the description proceeds. For the moment, disregard the presence of the spatial filter sector slit mask 19. In the absence of this element, lens 18, positioned with its front focal plane coincident with the Fourier transform plane 14, would simultaneously collect the light from all the Fourier transform diffraction lobes and form an inverted transparency image confined within dashed line 10'' in the image plane 17 located at the rear focal plane of lens 18. Each detector receives light corresponding to a discrete finite area of the transparency. Thus, for the case of the assumed ridge line orientations of areas 12*b*, 12*d* and 12*i* the image appears as shown at the location of detectors 16*b*, 16*d* and 16*i***. It will be appreciated that a greater or lesser number of detectors can be used depending on the number of sample areas desired to be used.

Figure 2:
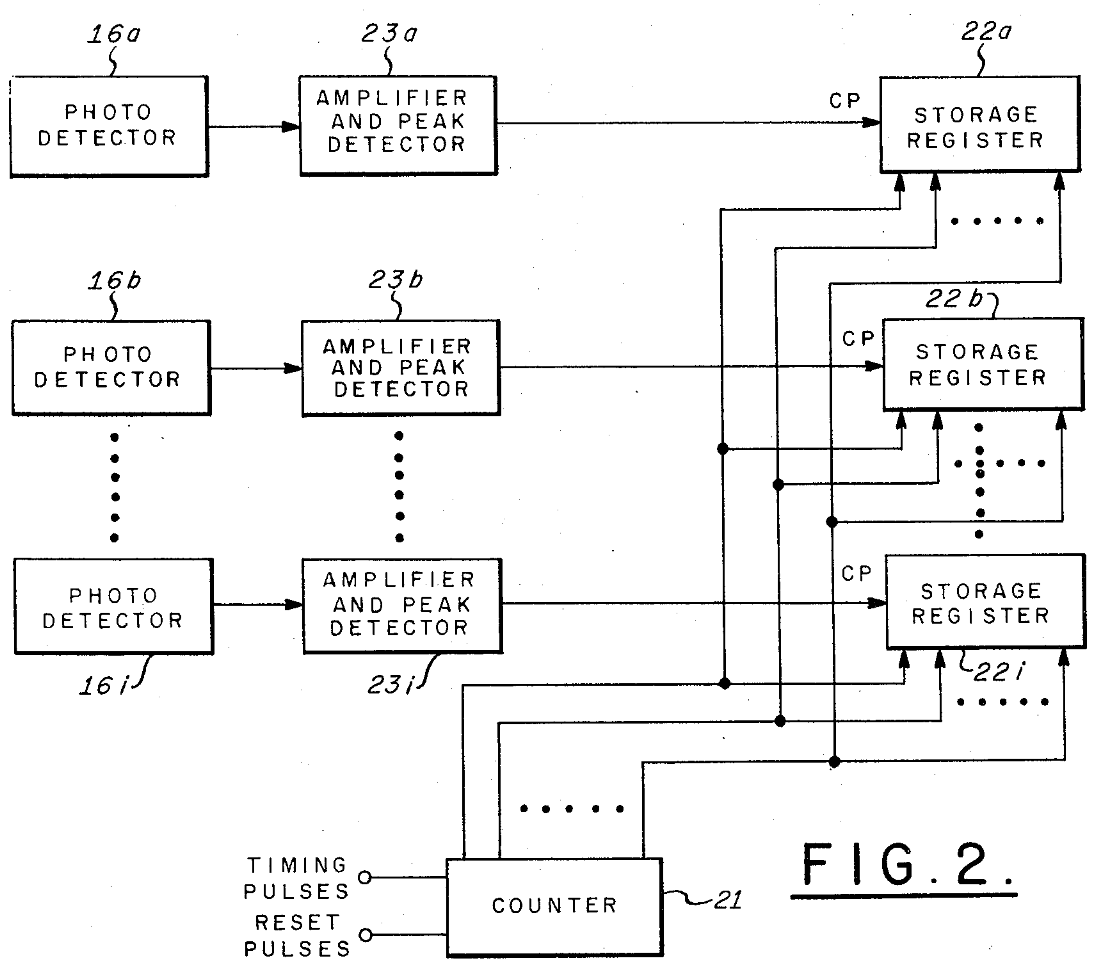
FIG. 2 is a simplified schematic illustration of digital processing equipment which may be used in combination with optical input devices constructed according to the present invention.
Figures 3A, 3B:
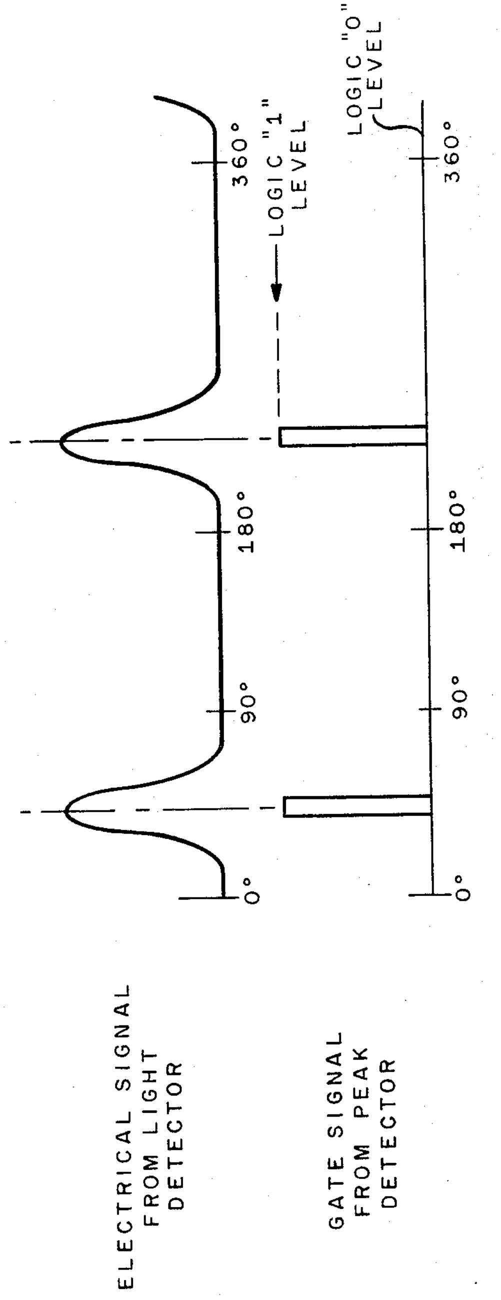
FIGS. 3*a* and 3*b* depict signal waveforms useful in explaining the operation of the invention.

Now consider the operation of the processor including the scanning sector slit mask 19 which is opaque except in the region of radial slit 19'. It will be noted that this slit does not extend to the center of the mask and therefore the undiffracted light is blocked at all times. The mask is rotated about an axis aligned with the optical axis of the processor so as to rotate in or closely parallel to the Fourier transform plane, the rotation being provided by a rim drive mechanism which is not shown in the drawings. As the mask rotates in a clockwise direction, it will successively intercept the Fourier transform lobes. Upon crossing the vertical reference axis 20, a counter 21 is reset to zero and a sequence of synchronized timing pulses, representing the slit orientation, is generated and sent to the counter as shown in FIG. 2. The stages of the counter, in turn, are coupled to the respective stages of 9 different storage registers **22*a* to 22*i* each associated with one of the nine light detectors of the image plane array. The number of pulses in the counter at any instant is representative of the angular position of the radial slit 19' relative to the vertical axis 20. Thus, in the case for instance of one clock pulse per degree of rotation, the counter will have a count of 45 upon reaching the position 45° clockwise from the vertical axis, at which time the Fourier lobe 12*i* will be transmitted through the radial slit to produce a peak in the electrical signal at the output of detector 16*i* as shown in FIG. 3*a*. This signal is applied to a peak detector 23*i*, which may be of conventional design, to produce a signal as shown in FIG. 3*b* at the output of the peak detector for application to the clock input terminals of an eight-bit storage register. Each eight-bit storage register consists of two binary latch circuits which operate to accept input data only when a gating clock input signal is applied to the clock input terminal of each stage of the register. Thus, a digital signal representative of the count of 45 will be stored in shift register 22*i* representing the angular orientation of the ridge lines in sample areas 12*i*. Likewise, upon rotating 90° into alignment with the horizontal axis 25 in the Fourier plane, the sector slit will transmit Fourier lobe 12*d*' corresponding to the ridge lines at sample area 12*d* and at that instant another photodetector will produce an electrical output signal which is applied through a related peak detector to provide a clock pulse to the associated storage register so that a digital signal corresponding to the instantaneous count of 90 is stored in that register. The same action occurs in the Fourier transform plane at each angle for which there is a detector in the image plane. Uniform speed control of the scanning radial slit is, of course, essential for accurate coding and identification unless provision is made for deriving the timing pulses directly from the rotating spatial filter mask as will be explained subsequently with reference to the apparatus of FIG. 4**. As a consequence of the symmetry in the Fourier plane and the parallel digital processing, it will be recognized that the digital representation of all sample areas can be generated in one-half revolution of the radial slit mask. In the case of serial digital processing, on the other hand, where a single storage register is time shared, it will be possible to generate the digital signal for only one sample area in each half revolution of the scanning spatial filter and thus a number of revolutions equal to at least half the number of sample areas will be necessary to inspect all the sample areas.

It should now be apparent that a unique digital signal will be stored in each storage register corresponding to the fingerprint ridge line orientation at each sample position. If the same transparency is similarly positioned in the processor at some later time, the same sample areas will produce essentially identical digital signals, which when compared with the previously stored signals will be noted to be substantially the same and thus indicate recognition. The likelihood of correlation of any other fingerprint transparency, however, with the digital signals corresponding to a particular print is remote. Although another fingerprint may have identically or somewhat similarly oriented ridge lines in some of the sample areas, the orientation will not be the same for all sample areas. For instance, if another fingerprint has vertically oriented lines in sample area 12*a*, it would produce the same Fourier lobe as the vertically oriented ridge lines in sampling area 12*d;* but sampling area 12*a* corresponds to a different detector and a different storage register so correlation would not occur.

Figure 4:
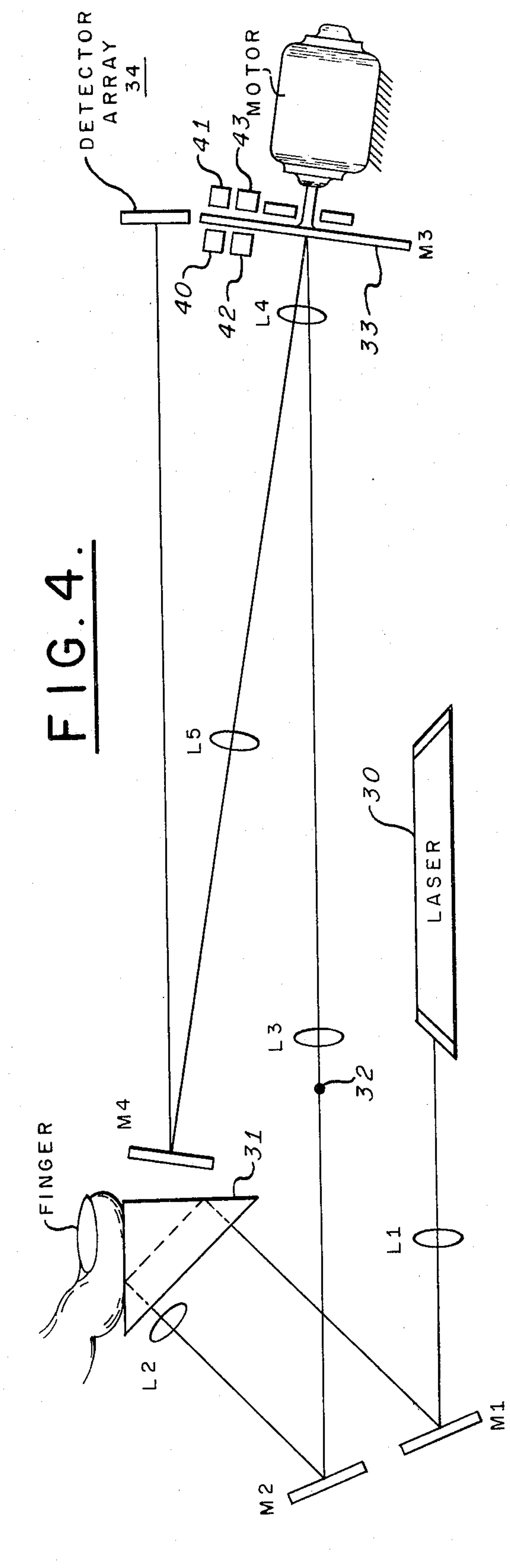
FIG. 4 is a schematic of a preferred apparatus constructed in accordance with the principles of the invention.
Figure 5A:
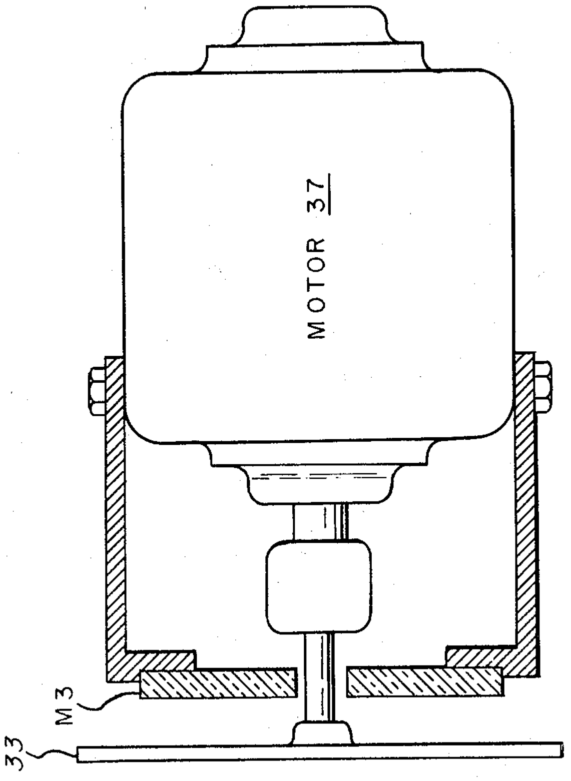
FIG. 5*a* is a side view partly in section of the scanning spatial filter used in the apparatus of FIG. 4.
Figure 5B:
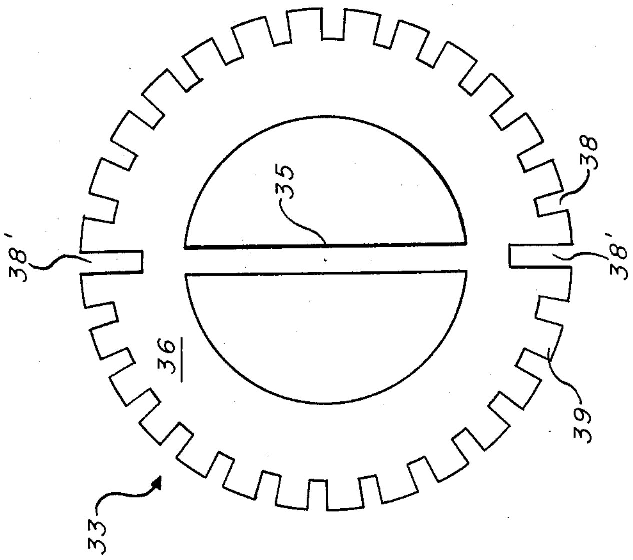
FIG. 5*b* is a front view of the scanning spatial filter of FIG. 4.

A preferred construction of the inventive apparatus is shown in FIG. 4. The output signals produced by this embodiment may be processed in the manner explained with reference to the apparatus of FIG. 1. The arrangement of FIG. 4 has the advantage of providing for central shaft drive of the Fourier transform plane scanner as opposed to the previously mentioned rim drive thereby assuring suitable speed control accuracy without the necessity for an elaborate gear and linkage mechanism. In addition, the apparatus of FIG. 4 provides for magnification of the Fourier transform pattern to achieve more accurate and facile scanning. Side and front views of the scanning spatial filter used in the apparatus of FIG. 4 are shown in FIGS. 5*a* and 5*b*. As shown in FIG. 4, light from a laser 30 passes through a lens L1 which diverges the light beam to form a beam diameter of approximately 1 inch at the top surface of prism 31 whereat the finger to be identified is positioned. As is well understood in the art, the beam, upon striking the top surface of the prism, is spatially modulated in accordance with the fingerprint pattern by the action of frustrated total internal reflection in the regions where the fingerprint ridges contact the prism. Lens L2 reconverges the light diverging from lens L1 to a focal point 32 slightly to the left of lens L3. Thus, an optical Fourier transform of the fingerprint occurs at this focal point. If the distance between lens L2 and the focal point is of convenient length, say 20 to 30 centimeters, the Fourier transform pattern will be too small for convenient scanning by an easily manufacturable spatial filter. Lens L3 is therefore used to form an enlarged image of the Fourier transform pattern coincident with the plane of the rotating spatial filter 33. Mirrors M1 and M2 are inserted in the optical path simply to provide for convenient positioning and orientation of the components and to provide a more compact device. For a typical case where the focal length of lens L3 is about 2 centimeters and has a magnification factor of about 15, a reduced size image of the fingerprint will be formed immediately to the right of that lens. Lens L4 is therefore included immediately adjacent to the spatial filter to function in cooperation with mirror M3 to re-image this reduced size image produced by lens L3 at a point immediately to the right of lens L5. Lens L5 then magnifies this image to form an approximately life-size image of the fingerprint coincident with the plane of the light detector array 34, by way of reflection from mirror M4.

Referring to FIGS. 5*a* and 5*b*, it is seen that the spatial filter 33 comprises an opaque blade 35 diametrically supported across a circular member 36. The composite blade and circular support structure is centrally driven by means of a shaft coupled to motor 37 to rotate in the magnified Fourier transform plane. The periphery of the blade support member 36 contains alternating transparent and opaque sections 38 and 39, respectively, which function in combination with the light source 40 and photodetector 41 for generating the timing pulses which are applied to the counter as hereinbefore explained with reference to FIGS. 1 and 2. Radially lengthened transparent segments 38' on diametrically opposite sides of the blade support member function in conjunction with an additional light source 42 and light detector 43 for providing the counter reset pulses to the apparatus of FIG. 2 for indicating crossings of the vertical axis or other arbitrarily selected reference point. As in the case of the FIG. 1 apparatus, a digital representation of the orientation of the ridge lines in each sample area can be generated by noting the angular displacement from a reference point in the magnified Fourier transform plane for each of the diffraction lobes relating to a particular detector in the life-size image plane. Also, as in the case of the FIG. 1 apparatus, because of the symmetry in the magnified Fourier transform plane, the digital representations of all the sample area ridge line orientations can be generated in one-half revolution of the scanning spatial filter blade. It will be appreciated that the blade type structure of the scanning spatial filter, as opposed to the slit structure of FIG. 1, will produce waveforms which are inverted with respect to those shown in FIGS. 3*a* and 3*b* in the sense that each detector receives light at all times except when intercepted by the blade. Hence, the photo-detector output signals will typically be at some comparatively high quiescent value and decrease to a minimum extreme at the instant the blade intercepts the light path of the related Fourier transform lobe. This mode of operation improves the quality of the image produced at the detector array.

Although the invention has been described with reference to digital processing, it will be appreciated that analog processing may also be employed. In this instance, the reference (vertical) axis signal could be used to initiate generation of a sawtooth voltage which would be terminated and repetitively initiated for every 180° of rotation of the spatial filter. As in the case of the digital processing, a single sawtooth generator could be time shared among the detectors with a single sample area being inspected during each half revolution of the spatial filter scanner, or the sawtooth generator could be used simultaneously in conjunction with all of the photodetector circuits to enable inspection of all sample areas in one-half revolution of the scanner.

Finally, it should be noted that further compensation for finger misalignment or misplacement can be provided by using a piezoelectrically driven two-dimensional scanning mirror in place of mirror M4 in the apparatus of FIG. 4. Recognition will then be possible as long as the two-dimensional mirror scanner can move the image over a sufficient range to compensate for translational mispositioning of the finger. If the fingerprint identification apparatus operates with parallel circuits for each photodetector so that all angle measurements are made in one-half revolution of the slit, recognition can occur every 1/120th of a second for a 3,600 rpm motor. If the scanning mirror moves through only a small distance in 1/120th of a second, the scanning motion need not be synchronized to the motor.

While the invention has been described in its preferred embodiments, it is to be understood that the words which have been used are words of description rather than limitation and that changes may be made within the purview of the appended claims without departing from the true scope and spirit of the invention in its broadest aspects.

I claim:

1. Fingerprint identification apparatus comprising means for producing an optical Fourier transform pattern representative of the fingerprint to be identified, the transform pattern being characterized by diffraction lobes generally concentrically disposed about the center of the pattern where the lobes lying along any radius of the pattern are produced by fingerprint ridge lines directed normal to the particular radius, a spatial filter having light transmitting and light blocking portions positioned to rotate in the plane of the transform pattern about the center thereof, means positioned to receive light transmitted through the filter for producing an image of the fingerprint, a plurality of photodetectors positioned at the location of the image and each disposed thereat to receive light transmitted through the filter corresponding to a discrete area of the fingerprint, a plurality of peak detectors each coupled to a respective photodetector for sensing a peak value of abrupt change in image light intensity at the related photodetector, a counter responsive to a signal indicative of a reference orientation of the filter for setting the counter to a starting value, means for generating a series of pulses synchronized with the angular rotation of the filter for application to the counter whereby the value in the counter at any instant is representative of the angular rotation of the filter from the reference orientation and a plurality of storage registers each coupled to the counter and to a respective peak detector and responsive to the peak detector output signal indicative of the abrupt change in image light intensity at the related photodetector for gating the instantaneous value of the counter into the associated register whereby at the end of a half revolution of the filter each register contains a digital signal representative of the ridge line orientation in the related discrete area of the fingerprint.

2. The apparatus of claim 1 wherein the spatial filter is an opaque mask having a radially directed transparent slit and rotatable about its center coincident with the focal point of the transform pattern for angularly scanning the transform pattern to produce an instantaneous increase in the peak light intensity at the respective photodetectors.

3. The apparatus of claim 1 wherein the spatial filter is an opaque bar rotatable about its center coincident with the focal point of the transform pattern for angularly scanning the transform pattern to produce an instantaneous decrease in the light intensity at the respective photodetectors.

4. The apparatus of claim 3 including a stationary mirror positioned closely behind the rotatable bar for reflecting light transmitted past the bar onto the mirror back past the bar to form the image at the plurality of photodetectors.

* * * * *